United States Patent
Choi et al.

(10) Patent No.: US 11,885,628 B2
(45) Date of Patent: Jan. 30, 2024

(54) ROUTE COORDINATION AND NAVIGATION BASED ON USER PROXIMITY TO POINTS OF INTEREST

(71) Applicant: Uber Technologies, Inc., San Francisco, CA (US)

(72) Inventors: Yuri Choi, San Francisco, CA (US); Guangqiang Zhang, San Francisco, CA (US)

(73) Assignee: Uber Technologies, Inc., San Francisco, CA (US)

(*) Notice: Subject to any disclaimer, the term of this patent is extended or adjusted under 35 U.S.C. 154(b) by 79 days.

(21) Appl. No.: 17/734,389

(22) Filed: May 2, 2022

(65) Prior Publication Data

US 2022/0260377 A1    Aug. 18, 2022

Related U.S. Application Data (63) Continuation of application No. 15/910,421, filed on Mar. 2, 2018, now Pat. No. 11,378,408.

(51) Int. Cl.
*G01C 21/34* (2006.01)
*G05D 1/02* (2020.01)

(52) U.S. Cl.
CPC ....... *G01C 21/3438* (2013.01); *G05D 1/0212* (2013.01)

(58) Field of Classification Search
CPC .................. G01C 21/3438; G05D 1/0212
See application file for complete search history.

(56) References Cited

U.S. PATENT DOCUMENTS

| | | | |
|---|---|---|---|
| 6,697,730 B2 * | 2/2004 | Dickerson | G07B 15/00 73/178 R |
| 9,357,054 B1 | 5/2016 | Froment | |
| 10,555,133 B1 * | 2/2020 | Cohen | H04W 4/026 |
| 2010/0201505 A1 | 8/2010 | Honary | |
| 2015/0278618 A1 | 10/2015 | Nuscheler | |
| 2016/0027307 A1 | 1/2016 | Abhyanker | |
| 2016/0042303 A1 | 2/2016 | Medina | |
| 2017/0282821 A1 | 10/2017 | Zych | |

(Continued)

FOREIGN PATENT DOCUMENTS

CN    106027660    10/2016

OTHER PUBLICATIONS

ISR and WO in PCT/US2019/019359 dated May 31, 2019.
IPRP in PCT/US2019/019359 dated Sep. 17, 2020.

*Primary Examiner* — Fadey S. Jabr
*Assistant Examiner* — Naeem Taslim Alam (57) ABSTRACT

A system receives sensor data from computing devices of passengers riding in an autonomous vehicle (AV). Based on the sensor data, the system can determine a position of each of the passengers within the AV. The system determines a next passenger to be picked up by the AV. Based at least in part on the position of each of the passengers within the AV, the system can (i) select a pickup location for the next passenger, and (ii) determine a route for the AV based on the pickup location such that an open seat within the AV is adjacent to the next passenger when the AV arrives at the pickup location for the next passenger. The system can transmit data corresponding to the route to enable the AV to update a current route in order to facilitate a rendezvous with the passenger at the pickup location.

20 Claims, 4 Drawing Sheets

(56) References Cited

U.S. PATENT DOCUMENTS

| | | | |
|---|---|---|---|
| 2018/0039917 A1* | 2/2018 | Buttolo | B60W 60/00253 |
| 2018/0218470 A1 | 8/2018 | Belwafa | |
| 2019/0172170 A1* | 6/2019 | Jabour | G06Q 30/0645 |
| 2019/0205813 A1* | 7/2019 | Sharma | G06F 16/951 |
| 2019/0228349 A1* | 7/2019 | Cornejo Arellano | G06Q 50/30 |
| 2019/0228662 A1* | 7/2019 | Van Hoecke | G06Q 50/30 |
| 2019/0344707 A1* | 11/2019 | Nelson | B60N 2/002 |
| 2020/0160709 A1 | 5/2020 | Ramot | |
| 2020/0249042 A1 | 8/2020 | Warr | |
| 2020/0302798 A1* | 9/2020 | Zhang | G06Q 50/30 |
| 2020/0372418 A1* | 11/2020 | Hirose | H04W 4/029 |
| 2021/0285783 A1 | 9/2021 | Warr | |

\* cited by examiner

ROUTE COORDINATION AND NAVIGATION BASED ON USER PROXIMITY TO POINTS OF INTEREST

CROSS-REFERENCE TO RELATED APPLICATION

This application is a continuation of U.S. patent application Ser. No. 15/910,421, filed on Mar. 2, 2018; which is hereby incorporated by reference in its entirety.

BACKGROUND

Network-based, on-demand transportation services can match requesting users with available transport providers. For example, based on the location of a requesting user, a network computing system that coordinates the on-demand transportation services can select a proximate transport provider, from a pool of candidate transport providers, based on the distance or estimated time of arrival of the proximate transport provider to a rendezvous location.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Hazards during passenger pick-up for transport services involve passengers jaywalking, entering the vehicle on the traffic side as opposed to curbside, walking across busy intersections, and the like. A network computing system described herein can coordinate on-demand transportation between users and transport providers throughout a transport service region. In various embodiments, the network computing system can receive transport requests from a user base via a designation service application executing on the computing devices of those users (e.g., smartphones or tablet computers). Based on the relative locations of the users and transport providers, and/or estimated arrival times of both the users and transport providers, the network computing system can match a given transport request with a transport provider and thereafter coordinate a rendezvous and pick-up.

According to examples described herein, the computing system can further receive transport requests from user computing devices of requesting users of an on-demand carpool service. The computing system can further receive sensor data from the user computing devices of each carpool passenger of a vehicle. Based on the sensor data, the computing system can determine a relative position of each carpool passenger within the vehicle. Based on the relative position of each carpool passenger within the vehicle, the computing system may then transmit route data to a transport provider device of the vehicle to rendezvous with one or more next carpool passenger(s) at an upcoming pick-up location such that one or more of the open seats within the vehicle are adjacent to the next carpool passenger(s) upon pick-up. In various aspects, the computing system can track the relative position of each carpool passenger within the vehicle dynamically based at least in part on the sensor data received from the user computing devices.

In certain implementations, the sensor data can be remotely accessed by the computing system via a designated transport service application executing on the computing devices of the carpool passengers. The computing devices can comprise mobile computing devices, such as smartphones or tablets. The sensor data can comprise inertial measurement unit (IMU) data from the integrated IMUs of the computing devices, BLUETOOTH localization data that describes the relative positions of each passenger—and in certain aspects, the driver—in relation to each other. In some variations, the sensor data can further include positioning system data (e.g., GPS location pings), Wi-Fi or other wireless signal data, and the like. In certain examples, the computing system can utilize such data to track the relative positions of each passenger as well as any empty seats within the vehicle. Upon receiving a carpool transport request from a requesting user and matching an occupied carpool vehicle to the user, the computing system can optimize routing of the vehicle such that an empty seat of the vehicle is curbside or adjacent to the requesting user upon pick-up. If no curbside empty seats exist, the computing system can transmit a notification to one or more of the passengers' computing devices to request a seat change such that an empty curbside seat is made available for the upcoming user.

In optimally routing the vehicle, the computing system can transmit turn-by-turn routing data to a computing device of the transport provider (e.g., a driver's smartphone or an on-board computing system of an autonomous vehicle) such that when the vehicle arrives at the rendezvous location, the user need not cross a street or intersection, nor enter the vehicle on the street side. Accordingly, the computing system can coordinate the route such that an empty seat within the vehicle is directly adjacent to the requesting user when the vehicle arrives. For autonomous vehicle implementations, the network computing system can transmit routing instructions to the autonomous vehicles' on-board control system to cause the control system to operate the control mechanisms (e.g., the acceleration, braking, and steering systems) along the optimized pick-up route such that the user can enter the vehicle from the curb without having to ask other passengers to move. For human-driven vehicle applications, the network computing system can leverage preemptive seat assignment requests to the current passengers, as well as optimize routing in order to both enable safe entry into the vehicle by upcoming carpool passengers, and prevent the necessity of either the upcoming passenger or driver from asking other passengers to change seats.

In various examples, the network computing system can receive the sensor data directly from the passengers' computing devices within the vehicle, or solely via the computing device of the transport provider. For example, the driver's computing device can execute a designated transport application that causes the device to determine the relative locations of the passengers within the vehicle. In some aspects, the computing device of the transport provider (e.g., the driver's mobile computing device) can do so by capturing image data of the passenger interior of the vehicle, audio data to perform audio localization of the passengers, ultrasonic beacons, wireless signal detection and positioning, and the like. Based on the locations of the passengers within the vehicle, as determined from the transport provider's device, the network computing system can assign seats and/or optimize routing for pick-up as described herein.

For autonomous vehicle implementations, the network computing system can receive sensor data from various sensor resources of the autonomous vehicle, such as seat sensors or an interior camera, to determine the positions of the passengers within the vehicle, and then perform route optimization and/or seat assignment operations described herein.

In certain examples, the network computing system can also remotely optimize passenger drop-off based on the relative locations of the passengers within the vehicle. In doing so, the computing system can route the vehicle such that the passenger is curbside within the vehicle when the vehicle arrives at the drop-off location.

As used herein, a computing device refers to devices corresponding to desktop computers, cellular devices or smartphones, personal digital assistants (PDAs), laptop computers, virtual reality (VR) or augmented reality (AR) headsets, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, VR or AR devices, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Some examples are referenced herein in context of an autonomous vehicle (AV) or self-driving vehicle (SDV). An AV or SDV refers to any vehicle which is operated in a state of automation with respect to steering and propulsion. Different levels of autonomy may exist with respect to AVs. For example, some vehicles may enable automation in limited scenarios, such as on highways, provided that drivers are present in the vehicle. More advanced AVs can drive without any human assistance from within or external to the vehicle. Such vehicles are often required to make advanced determinations regarding how the vehicle behaves given challenging surroundings of the vehicle environment.

System Description

Figure 1:
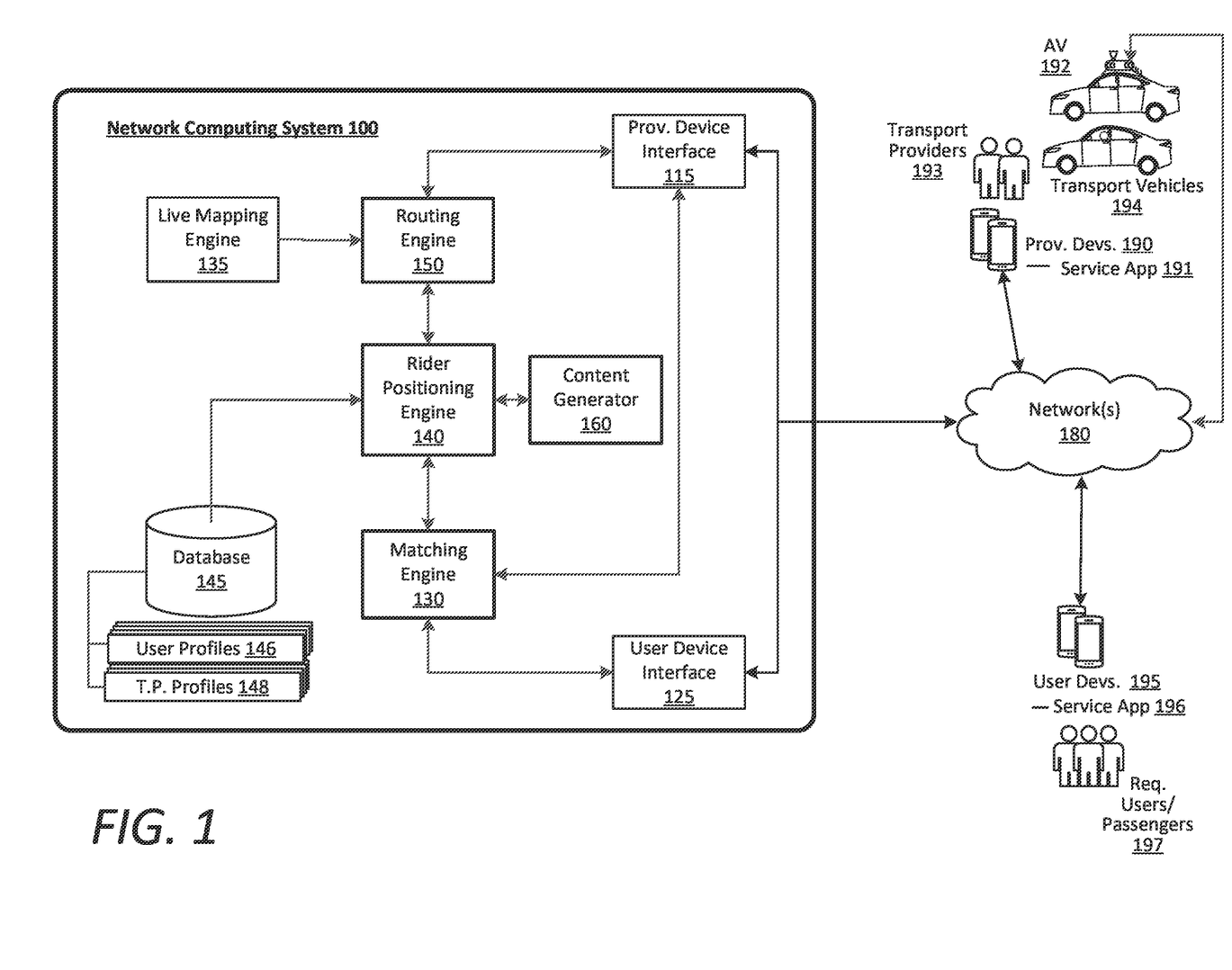
FIG. 1 is a block diagram illustrating an example computing system in communication with users and transport providers, in accordance with examples described herein.

FIG. 1 is a block diagram illustrating an example network computing system in communication with user devices and transport providers, in accordance with examples described herein. In various examples, the network computing system 100 can include a user device interface 125 that connects with the user devices 195 of requesting users 197 over one or more networks 180. The network computing system 100 can further include a provider interface 115 that connects with transport provider devices 190 over one or more networks 180. As described herein, the transport provider devices 190 and user devices 195 can comprise computing devices, such as a smartphone, tablet computer, or other mobile computing devices.

According to some examples, transport vehicles 194 that provide on-demand transport services for the region can include human driven vehicles operated by the transport providers 193, and can also include autonomous vehicles (AVs) 192 that can be readily directed by the network computing system 100 to service transport requests from requesting users 197. For example, a matching engine 130 of the network computing system 100 can match a transport request from a user 197 with an AV 192 (e.g., based on the AV 192 being proximate to the user 197) and transmit a transport directive that causes the AV 192 to reroute and rendezvous with the user 197. Accordingly, the network computing system 100 can coordinate pick-ups and drop-offs of users, packages, comestible goods, and other freight between requesting users 197 and a pool of available transport vehicles 194, which can comprise vehicles operated by human transport providers 193 as well as AVs 192.

In certain implementations, each transport provider 193 within a given transport service region can execute a service application 191 on the transport provider device 190 to initiate an on-duty or available status. Further, the requesting users 197 can execute a transport application 196 on their respective user devices 195 to configure an on-demand transport request (e.g., for user transport, food delivery, freight or package delivery, etc.). In some aspects, the user 197 can configure a specified destination and/or a specific or suggested pick-up location to rendezvous with a matched transport provider 193 and vehicle 194.

According to examples described herein, the network computing system 100 can include a matching engine 130, which can receive the transport requests from the user devices 195 of the requesting users 197. In various examples, the matching engine 130 can further receive location data from the transport provider devices 190 indicating the dynamic locations of the transport providers 193 operating throughout the transport service region. In certain aspects, the network computing system 100 can further include a mapping engine 135 that generates map data, enabling the matching engine 130 to identify the respective locations of the transport providers 193 based on orientation, direction of travel, available routes, and estimated times of arrival to a rendezvous location with the requesting user 197. Based on an estimated distance or time to the rendezvous location, the matching engine 130 can select a particular transport provider 193 to rendezvous with the requesting user 197 to service the transport request.

In certain implementations, the matching engine 130 can access a user profile 146 of the requesting user 197 stored in a local database 145 to, for example, determine user preferences, such as a preferred vehicle type, transport service type, a preferred pick-up location (e.g., within a certain proximity of the user's current location), and the like. In various aspects, the matching engine 130 can further access transport provider profiles 148 of a candidate set of transport providers 193 (e.g., operating within a certain distance or time from the user's current location), and filter the candidate set based on the user's inputted or determined preferences (e.g., a luxury vehicle service). Accordingly, the matching engine 130 can select a matching transport provider from the filtered set of candidate transport providers 193 to service a given transport request.

According to examples described herein, the network computing system 100 can include a rider positioning engine 140 that can track the positions of riders 197 within the transport vehicles 194 as the vehicles 194 operate throughout the transport service region. In certain implementations, the rider positioning engine 140 can receive sensor data from the transport vehicle 194 (e.g., an interior camera or seat sensor), the computing device 190 of the transport provider 193, and/or the computing device 195 of the requesting user 197 to identify a position of the rider within the vehicle 194. As the matching engine 130 matches the transport provider 193 with sequential carpool passengers 197, the rider positioning engine 140 can track the positions of current occupants within the vehicle 194, and output the positions to a routing engine 150. In certain aspects, the rider positioning engine 140 can further track empty seats within the vehicle 194.

In various examples, the sensor data from the user computing devices 192 can comprise inertial measurement unit (IMU) data from integrated IMUs of the computing devices 192, BLUETOOTH localization data that describes the relative positions of each passenger 197—and in certain aspects, the transport provider 193—in relation to each other. In some variations, the sensor data can further include positioning system data (e.g., GPS location pings), Wi-Fi or other wireless signal data, and the like. In one aspect, the rider positioning engine 140 can be triggered to monitor IMU data from the user device 195 when the user enters the vehicle 194, and based on the data signatures (e.g., accelerometer and gyroscopic sensor data) from the IMU of the user device 195, track the passenger's movement within the vehicle 194 to determine which seat the passenger 197 occupies.

In certain implementations, the sensor data can be remotely accessed by the rider positioning engine 140 via the designated transport service application 196 executing on the computing devices 195 of the carpool passengers 197. The computing devices 195 can comprise mobile computing devices, such as smartphones or tablets. In various examples, the rider positioning engine 140 can receive the sensor data directly from the passengers' computing devices 195 within the vehicle, and/or via the computing device 190 of the transport provider 193.

For example, the transport provider's computing device 190 can execute a designated transport application 191 that causes the device 190 to determine the relative locations of the passengers 197 within the vehicle 194. In some aspects, the computing device 190 of the transport provider 193 (e.g., the driver's mobile computing device) can do so by capturing image data of the passenger interior of the vehicle 194, audio data to perform audio localization of the passengers 197, ultrasonic beacons, wireless signal detection and positioning, and the like. Based on the locations of the passengers 197 within the vehicle 194, the rider positioning engine 140 can assign seats and/or the routing engine 150 can optimize routing for pick-up as described herein.

Furthermore, for autonomous vehicle 192 implementations, the rider positioning engine 140 can receive sensor data from various sensor resources of the autonomous vehicle 192, such as seat sensors or an interior camera, to determine the positions of the passengers 197 within the vehicle 192.

Output from the rider positioning engine 140 can be received by the routing engine 150, which can transmit route data to the provider device 190 of the transport provider 193, or an on-board computing system of the AV 192, to optimize a next carpool passenger pick-up. The output can comprise the seating positions of the current carpool passengers within the vehicle and/or the current empty seat(s) within the vehicle. The routing engine 150 can further receive match data from the matching engine 130 to determine the location of a next carpool pickup or drop-off. The routing engine 150 can transmit route data to the transport provider 193 such that the transport vehicle 194 picks up or drops off the carpool passenger 197 on the curbside of the vehicle 194 to prevent entry into and exiting from the vehicle 194 on the street side.

For example, the routing engine 150 can transmit route data to the provider device 190 of the transport provider 193 (e.g., via the executing service application 191) that will cause the transport vehicle 194 to arrive at the pickup location such that an empty seat of the vehicle is curbside adjacent the upcoming passenger 197. For one-way roads, the transport provider 193 can operate the vehicle 194 to ensure that the upcoming passenger 197 is picked up from the curbside so as to avoid forcing the upcoming passenger 197 to cross the road. For two-way roads, the routing engine 150 can route the transport provider 193 in a manner that causes the transport vehicle 194 to arrive at the pickup location such that the upcoming passenger can enter the vehicle 194 from the curbside and with an empty seat adjacent to the upcoming passenger available. At times, this may involve the vehicle 194 being routed such that the overall ETA and route length are slightly increased.

For example, the determination of whether the transport provider 193 or the upcoming passenger 197 is to change the route or pick-up location respective, can be at least partially dependent upon a safety factor for all parties. In such examples, safety can comprise a factor contributing to a convenience threshold. For example, the user profile of the upcoming rider 197 may indicate a history of that rider 197 not opting to walk (e.g., for physical/disability reasons). As another example, a rendezvous intersection at which the transport provider 193 is to meet the upcoming rider 193 may be currently busy or have a dangerous history (e.g., a history of traffic accidents). In other examples, a transport provider 193 on a one-way street may have to cross several lanes in a short amount of time.

In various examples, the routing engine 150 can weigh convenience to the transport provider 193 and upcoming passenger 193 in determining which of the two will be rerouted, or whether both are to be rerouted or asked to change locations. The convenience threshold for the upcoming passenger 197 can correspond to a distance the passenger 197 would have to walk to relocate to a safer or more practical pick-up location. Second order considerations may also be considered, such as the terrain of the walking environment (e.g., whether there are hills), the characteristics of the passenger 197 (e.g., age, weight, etc.), a number of intersections that must be crossed, and/or how large or busy those intersections are. Accordingly, for any proposed relocation point for the upcoming passenger 197, the routing engine 150 can weigh a set of convenience factors—include safety factors—and determine whether such factors meet or exceed a convenience threshold. This convenience threshold can correlate to a probability that the upcoming passenger 197 will be satisfied with the service (e.g., based on historical satisfaction data from previous relocations of the user base).

The convenience threshold for the transport provider 193 can correspond to added ETA to the rendezvous location, current traffic conditions, and a risk factor in rerouting the transport provider 193. For example, the routing engine 150 can determine whether an updated route is practical for the transport provider 193, given the transport provider's current speed, direction, lane, and traffic conditions. Thus, the routing engine 150 will not reroute the transport provider 193 if erratic or unsafe driving is to be performed (e.g., crossing more than two lanes within 100 meters). Additionally, the routing engine can take into consideration legal driving rules (e.g., picking up the upcoming passenger 197 at a bus stops), road construction along the original route or a new route, road conditions, and the like. Accordingly, the routing engine 150 can balance the convenience and safety to both the transport provider 193 and the upcoming passenger 197 in deciding which of the two (or both) should be asked to reroute or relocate, and the specific route or new rendezvous location for the pick-up.

It is contemplated that a curbside empty seat within the transport vehicle may not be readily available in all scenarios, which may result in deficiencies in the coordination between the matching engine 130, the rider positioning engine 140, and the routing engine 160. According to various examples, the network computing system 100 can further include a content generator 160 that can coordinate with the rider positioning engine 140 and routing engine 150 to reconfigure the current passengers within the transport vehicle 194 to ensure that an empty seat is curbside for an upcoming pickup. In such examples, the network computing system 100 can operate according to a priority hierarchy for any given upcoming pickup.

In certain examples, a received carpool transport request may require more than one seat for multiple passengers. In such examples, the matching engine 130 can filter out candidate transport providers 193 that currently do not have enough empty seats to fulfill the request. Furthermore, the rider positioning engine 140 can coordinate with the content generator 160 to reposition the current passenger(s) within the vehicle such that the upcoming passengers 197 sit proximate or adjacent to each other.

The priority hierarchy can comprise an initial priority that the transport vehicle 194 be matched with upcoming passengers 197 such that a curbside empty seat is available within the vehicle 194 given the pick-up location. In certain implementations, if a curbside empty seat is unavailable, the content generator 160 may transmit a suggested pick-up location update to the user device 195 of the upcoming passenger, such that an empty seat is curbside. In some examples, this updated pick-up location may be accepted or declined by the upcoming passenger. In variations, the updated pick-up location may be mandated by a selected transport service (e.g., a lower cost, express carpool service in which users 197 walk a certain distance for pick-ups and/or destinations to optimize global flow of the transport providers 193 throughout a given region).

When an empty curbside seat is still not available for the pick-up location, then as a secondary priority, the routing engine 150 may determine whether an empty curbside may be achieved through routing. If so, the routing engine 150 can route the transport vehicle 194 such that the upcoming passenger 197 enters the vehicle 194 from the curbside with an empty seat available adjacent to the upcoming passenger 197. However, if an empty curbside seat cannot be achieved through routing, then as a tertiary priority, the content generator 160 may transmit seat repositioning requests to the current carpool occupants of the vehicle 194 to make an empty curbside seat available for the upcoming pickup. For example, the content generator 160 can transmit a repositioning request to a current carpool passenger sitting in the right, rear seat of the vehicle 194, so that an upcoming passenger 197 may be picked up from the right side of a busy, two-way street.

In various examples, the rider positioning engine 140 can further coordinate with the routing engine 140 to take into account passenger drop-offs to further optimize the seating arrangement of the carpool passengers 197 within the vehicle 194. For example, if a current passenger is being dropped off on a one-way street (e.g., the left side of a one-way street), then the rider positioning engine 140 can flag the passenger 197 as a candidate that can occupy either the left or the right rear seat of the transport vehicle 194. However, if a current passenger is being dropped off on the right side of a two-way street, the rider positioning engine 140 can lock the passenger to a right-side seat of the vehicle 194. For example, prior to pick-up, the content generator 160 can transmit a seat assignment to the user device 195 of the upcoming passenger 197 indicating the front left passenger seat as the assigned seat for this passenger 197. Accordingly, the rear seats may be left freed for carpool passengers that may have more changeable or variable pick-up and/or drop-off locations (e.g., for street corner pickups and drop-offs).

For autonomous vehicle 192 implementations, the front and rear seats of the AV 192 may be utilized. In further examples, the vehicle 194 (whether human-driven or AV 192) may include additional rows of seats that the rider positioning engine 140 can utilize to optimally position passengers 197 within the vehicle to ensure minimal in-vehicle shuffling and avoiding scenarios in which the upcoming passenger 197 must enter the vehicle from the street side, and where a next drop-off passenger must exit the vehicle from the street side. Accordingly, the routing engine 150, rider positioning engine 140, content generator 160, and matching engine 130 can coordinate the upcoming passenger 197, the routing of the transport vehicle 194, and the positions of the passengers within the vehicle 194 to ensure that only curbside pick-ups and drop-offs are performed.

The content generator 160 can transmit displayable content that indicates or highlights the assigned seat or the requested repositioning seat to the current and upcoming passengers of the vehicle 194. In variations, the content generator 160 can transmit notifications, such as text messages or emails to the upcoming passenger 197 and/or current passengers of the carpool vehicle 194.

Uncoordinated or marginally coordinated pick-ups and drop-offs utilized by some transport service providers can result in dangerous situations involving riders rushing across busy streets or intersections in order to enter awaiting vehicles. Thus, a technical problem exists in the lack of intelligent coordination between matching, routing, rider positioning, and rider repositioning in current transport services. The example network computing system 100 described herein offers a technical solution to this problem by providing such intelligent, computer network-driven coordination to ensure both increased pick-up and drop-off efficiencies and increased safety for carpool passengers 197.

Computing Device

Figure 2:
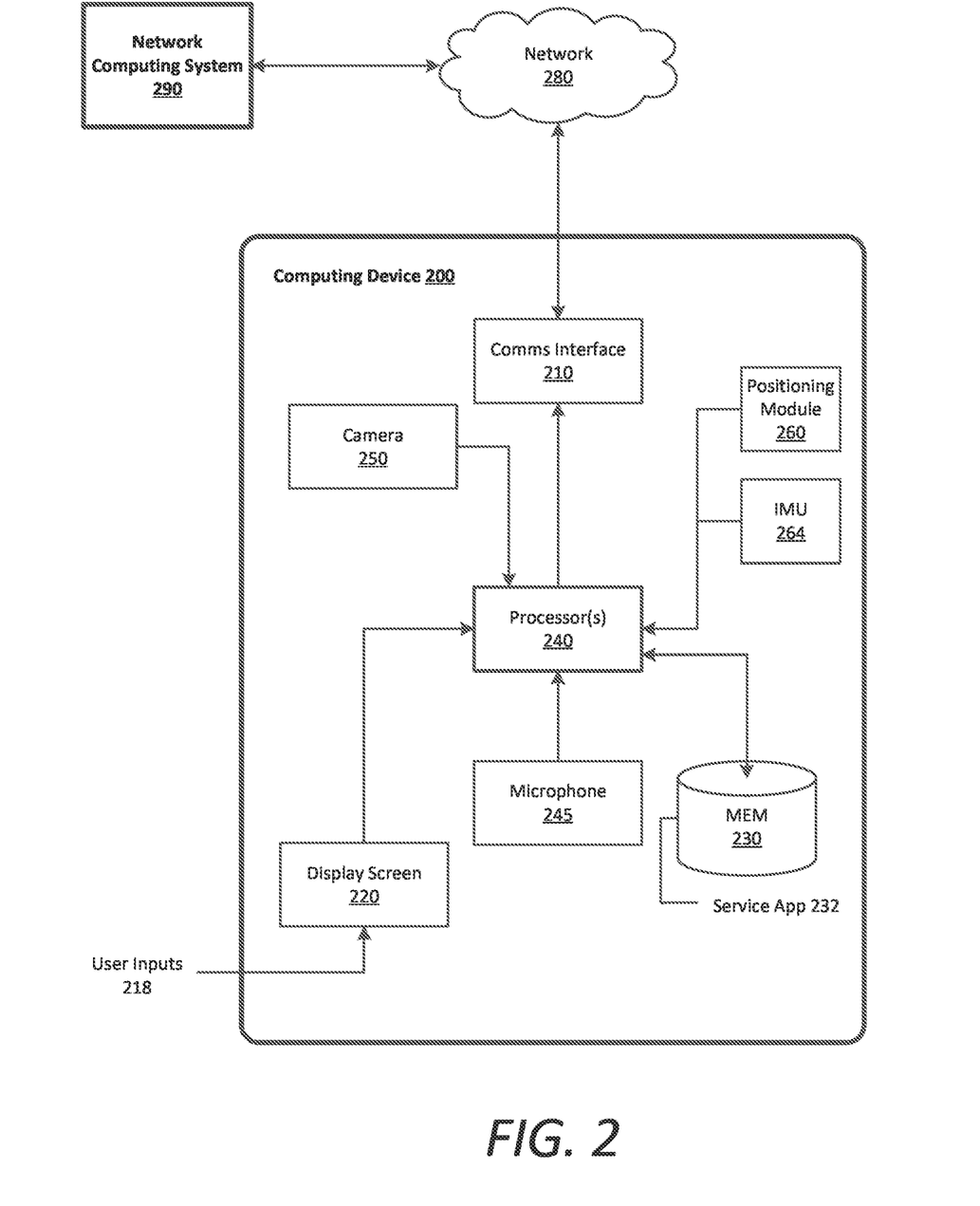
FIG. 2 is a block diagram illustrating an example user or transport provider device executing and operating a designated transport application for communicating with a network transport service, according to examples described herein.

FIG. 2 is a block diagram illustrating an example computing device of a user or transport provider executing a designated transport service application for communicating with a network transport service, according to examples described herein. In many implementations, the computing device 200 can comprise a mobile computing device, such as a smartphone, tablet computer, laptop computer, VR or AR headset device, and the like, and can be controlled by either a human transport provider 193 or a requesting user 197 described with respect to FIG. 1. The computing device 200 can include typical telephony features such as a microphone 245, a camera 250, and a communication interface 210 to communicate with external entities using any number of wireless communication protocols. The computing device 200 can further include a positioning module 260 and an inertial measurement unit 264 that includes one or more accelerometers, gyroscopes, or magnetometers. In certain aspects, the computing device 200 can store a designated application (e.g., a service app 232) in a local memory 230. In the context of FIG. 1, the service app 232 can comprise the service app 196 executable on the user device 195 or the transport service app 191 executable on the transport provider device 190. In variations, the memory 230 can store additional applications executable by one or more processors 240 of the user device 200, enabling access and interaction with one or more host servers over one or more networks 280.

In response to a user input 218, the service app 232 can be executed by a processor 240, which can cause an app interface to be generated on a display screen 220 of the computing device 200. The app interface can enable the user to, for example, configure an on-demand transport request, or display turn-by-turn map directions (e.g., based on route data transmitted by the network computing system 290). In various implementations, the app interface can further enable the user to enter or select a destination location (e.g., by entering an address, performing a search, or selecting on an interactive map). The user can generate the transport request via user inputs 218 provided on the app interface. For example, the user can input a destination and select a transport service option to configure the transport request, and select a request feature that causes the communication interface 210 to transmit the transport request to the network computing system 290 over the one or more networks 280.

As provided herein, the transport service application 232 can further enable a communication link with a network computing system 290 over the network(s) 280, such as the computing system 100 as shown and described with respect to FIG. 1. The processor 240 can generate user interface features (e.g., map, request status, etc.) using content data received from the network computing system 290 over the network(s) 280.

The processor 240 can transmit the transport requests via a communications interface 210 to the backend network computing system 290 over the network 280. In response, the computing device 200 can receive a confirmation from the network system 290 indicating the selected transport provider that will service the request. In various examples, the computing device 200 can further include a positioning module 260, which can provide location data indicating the current location of the requesting user to the network system 290 to, for example, determine the rendezvous location.

In certain examples, while the service application 232 is executing, the processor 240 can receive sensor data requests from the network computing system 290, and/or transmit sensor data to the network computing system 290 to enable the system 290 to track the passenger's position within the vehicle. As provided herein, the sensor data can comprise any combination of image data from the camera 250, audio data from the microphone 245, IMU data (e.g., accelerometer, gyroscopic, and/or magnetometer data) from the IMU 264, and/or positioning data from the positioning module 260. In still further examples, the sensor data can comprise signal strength data and/or BLUETOOTH localization data from the communications interface 210.

In various aspects, the network computing system 290 can transmit a seat assignment or repositioning request to the computing device 200 via the executing service application 232. The processor 240 can cause content to be displayed on the display screen 220 indicating the seat assignment or repositioning request. Additional notification alert signals can be executed, such as visual, haptic, and/or alerts to notify the passenger of the seat assignment or repositioning request. In certain aspects, the network computing system 290 can monitor the sensor data from the computing device 200 to determine whether the user has complied with the repositioning request.

Methodology

Figure 3:
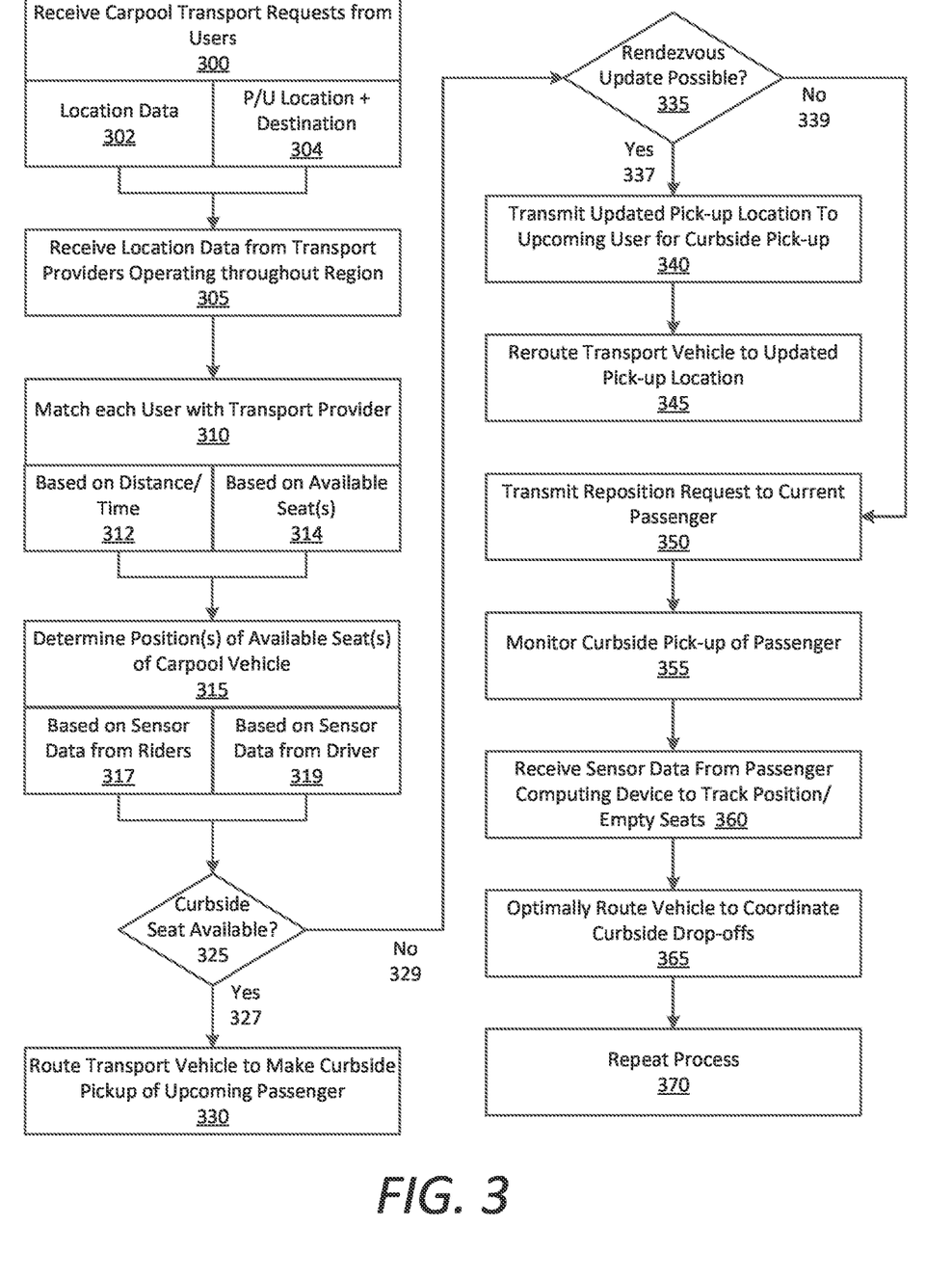
FIG. 3 is a flow chart describing an example method of coordinating a carpool transport service, according to examples described herein.

FIG. 3 is a flow chart describing an example method of coordinating a carpool transport service, according to examples described herein. In the below description of FIG. 3, reference may be made to reference characters representing like features as shown and described with respect to FIGS. 1 and 2. Furthermore, the processors described in connection with FIG. 3 may be performed by an example network computing system 100, 290 as shown and described with respect to FIGS. 1 and 2. Referring to FIG. 3, the system 100 can manage an on-demand carpool transport service by receiving carpool transport requests from users 197 (300). In various examples, the carpool transport requests can include a desired pick-up location and/or destination (304). In certain implementations, the transport request can further trigger the system 100 to access location data from a positioning module 260 of the user's computing device 200 (302).

According to examples described herein, the system 100 can further receive location data from the computing devices 190 of transport providers 193 operating throughout the transport service region (305). The system 100 can match each user 197 with a transport provider 193 (310). In some aspects, the system can do so based on distance and/or time of the current location of the transport provider 193 to the requesting user's current location or the pick-up location (312). Additionally or alternatively, the system 100 can match the user 197 to a transport provider 197 based on the available seat(s) within the transport provider's vehicle (314). As such, the system 100 can determine the position(s) of the available seat(s) of the carpool transport vehicle 194 (315).

As described, the system 100 can determine the available seat(s) based on sensor data from the computing devices 195 of the current passengers of the carpool vehicle (317). For example, the sensor data can comprise IMU data, audio data, image data, wireless signal strength data, wireless beacon data or time of flight data (e.g., to determine relative positions or distances between the passengers and/or driver), wireless localization data, and the like. In certain examples, the system 100 can further receive determine the available seat(s) based on sensor data from the computing device 190 of the transport provider 193 (319). For example, the transport provider 193 may position or mount the computing device 190 such that a field of view of a camera (e.g., a forward-facing camera) encompasses the passenger interior of the vehicle 194. In such examples, the system 100 can access image data from the computing device 190 of the transport provider 193 to determine the locations of the empty seats within the vehicle 194. For AV implementations, AV sensor data (e.g., an interior camera) may be accessed by the system 100 to determine the empty seat(s). Along these lines, the system 100 can transmit route data to the AV 192 to cause the on-board computing system of the AV 192 to autonomously operate control mechanisms of the AV 192 (e.g., acceleration, braking, and steering systems) in order to cause the AV 192 to rendezvous with the next carpool passenger at the upcoming pick-up location such that the open seat within the vehicle is adjacent to the next carpool passenger.

In various implementations, based on the current positions of the passengers within the vehicle 194, the system 100 can determine whether a curbside seat is available for the upcoming pick-up (325). If so (327), then the system 100 can transmit turn-by-turn route data to the transport provider 193 to route the vehicle 194 in order to make the curbside pick-up of the upcoming passenger (330). However, if not (329), then the system 100 can determine whether to either update the pick-up location or to compel a current passenger to change seats.

In certain examples, the system 100 can determine whether a rendezvous update is possible to ensure a curbside pick-up (335). For example, if the user is on a two-way street, no right-side seats are available, and no left-hand side pick-up locations are within proximity of the upcoming passenger, then the system 100 can resort to a repositioning request to one of the current passengers. However, if a left-side seat is available and the user is located on a one-way street—making a left, curbside pickup possible—then the system 100 can opt to update the rendezvous location instead of compelling a current passenger to reposition within the vehicle 194. In some aspects, a secondary constraint concerning the ETA of the vehicle 194 to the rendezvous location may be considered by the system 100 prior to updating the pick-up location. For example, if the vehicle 194 is within a minute of arrival, then the upcoming passenger may not have sufficient time to traverse to the updated pick-up location by the time the vehicle 194 arrives. Thus, prior to updating the pick-up location, two constraints comprising a minimum ETA threshold for the vehicle 194 and the possibility of left-side pick-up must be met in order to transmit a pick-up location update to the upcoming passenger.

Accordingly, if the rendezvous update is possible (337), then the system 100 can transmit data indicating the updated pick-up location to the computing device 195 of the upcoming passenger 197 (340), and transmit reroute data to the transport provider 193 to route the transport vehicle 194 to the updated pick-up location (345). In certain aspects, the updated pick-up location may be transmitted to the upcoming passenger 197 in the form of a query and/or discount offer, which the upcoming passenger 197 can either accept or decline. If accepted, then the system 100 can move forward with rerouting the vehicle 194. However, if not accepted, then the system 100 can resort to repositioning a current passenger.

If a rendezvous update is not possible (339), then the system 100 can select a current passenger of the vehicle 194 for repositioning, and transmit a repositioning request to the selected passenger (350). The system 100 may then monitor the curbside pick-up of the passenger (355), and receive sensor data (e.g., IMU data) from the computing device 195 of the new passenger 197 to track the position of the passenger 197 within the vehicle 194 and/or track the empty seats within the vehicle 194 (360). According to various aspects, the system 100 can optimally route the vehicle 194 to further coordinate drop-offs such that they occur on the curbside as well (365). At block (370), the process can repeat as long as the carpool vehicle is available to service carpool transport requests.

Hardware Diagram

Figure 4:
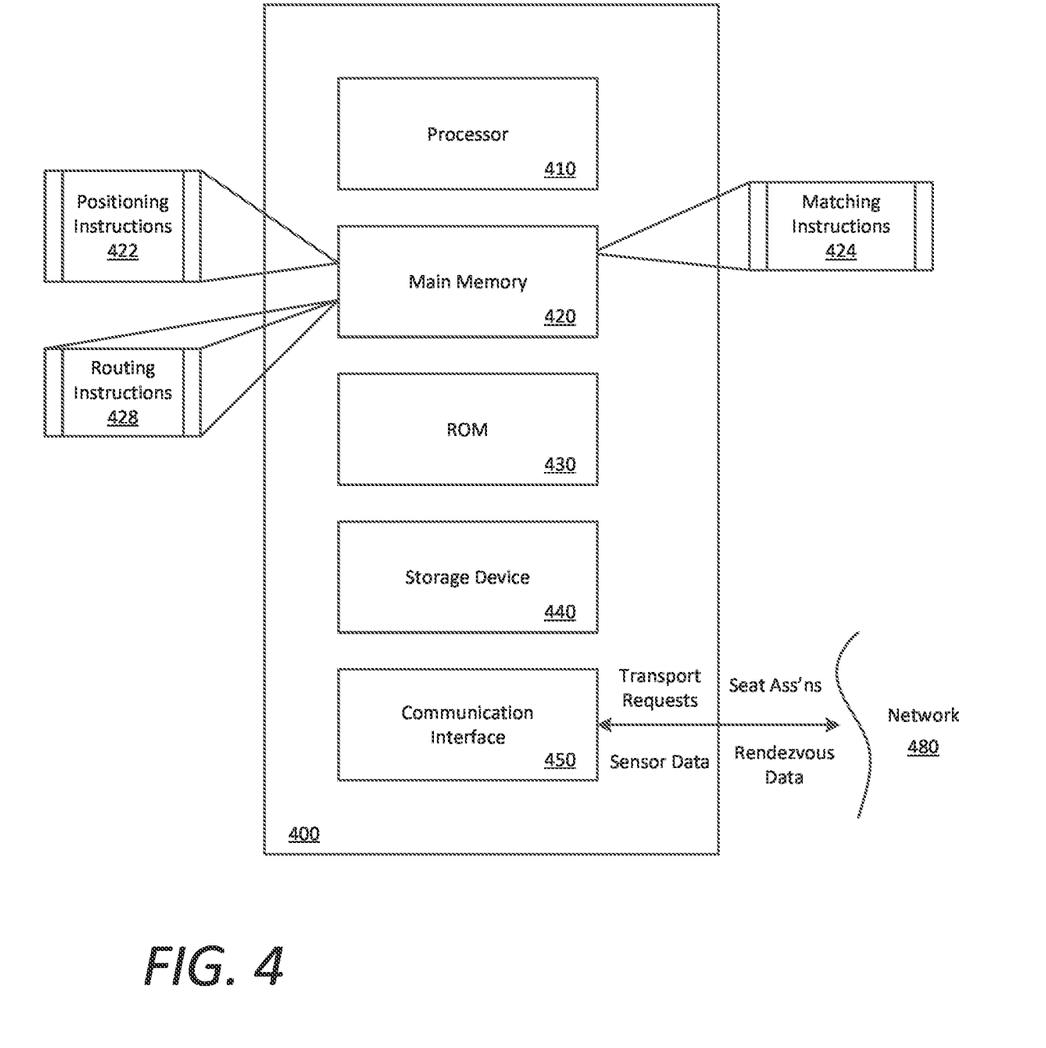
FIG. 4 is a block diagram that illustrates a computing system upon which examples described herein may be implemented.

FIG. 4 is a block diagram that illustrates a computing system upon which examples described herein may be implemented. A computing system 400 can be implemented on, for example, a server or combination of servers. For example, the computing system 400 may be implemented as part of a network service, such as described in FIGS. 1 and 2. In the context of FIG. 1, the network computing system 100 and/or an on-board computing system of the AV 192 may be implemented using a computing system 400 such as described by FIG. 4. The network computing system 100 and/or computing system of the AV 192 may also be implemented using a combination of multiple computing systems as described in connection with FIG. 4.

In one implementation, the computing system 400 includes processing resources 410, a main memory 420, a read-only memory (ROM) 430, a storage device 440, and a communication interface 450. The computing system 400 includes at least one processor 410 for processing information stored in the main memory 420, such as provided by a random-access memory (RAM) or other dynamic storage device, for storing information and instructions which are executable by the processor 410. The main memory 420 also may be used for storing temporary variables or other intermediate information during execution of instructions to be executed by the processor 410. The computing system 400 may also include the ROM 430 or other static storage device for storing static information and instructions for the processor 410. A storage device 440, such as a magnetic disk or optical disk, is provided for storing information and instructions.

The communication interface 450 enables the computing system 400 to communicate with one or more networks 480 (e.g., cellular network) through use of the network link (wireless or wired). Using the network link, the computing system 400 can communicate with one or more computing devices, one or more servers, one or more databases, and/or one or more self-driving vehicles. In accordance with examples, the computing system 400 receives transport requests from mobile computing devices of individual users. The executable instructions stored in the memory 430 can include matching instructions 424, which the processor 410 executes to match a requesting user with a transport provider, as described herein.

The executable instructions stored in the memory 420 can also include routing instructions 428 and rider positioning instructions 422. The processor 410 can execute the routing instructions 428 to optimally route the transport vehicle such that a next passenger is picked up on the curbside, where an empty seat is available upon the user's entry into the vehicle. The process can further execute the rider positioning instructions 422 to process sensor data from the computing devices of the passengers and/or transport provider or AV sensors to track or determine the positions of the passengers within the vehicle. In certain examples, the processor 410 can further execute the rider positioning instructions 422 to transmit repositioning requests to select passengers in coordination with the routing instructions, and to transmit seat assignments and rendezvous data to upcoming passengers.

Examples described herein relate to the use of the computing system 400 for implementing the techniques described herein. According to one example, those techniques are performed by the computing system 400 in response to the processor 410 executing one or more sequences of one or more instructions contained in the main memory 420. Such instructions may be read into the main memory 420 from another machine-readable medium, such as the storage device 440. Execution of the sequences of instructions contained in the main memory 420 causes the processor 410 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A computing system comprising:
   a network communication interface;
   one or more processors; and
   a memory storing instructions that, when executed by the one or more processors, cause the computing system to:
     receive, via the network communication interface, sensor data from computing devices of passengers riding in an autonomous vehicle (AV);
     based on the sensor data, determine a position of each of the passengers within the AV;
     determine a next passenger to be picked up by the AV;
     based at least in part on the position of each of the passengers within the AV, (i) select a pickup location for the next passenger, and (ii) determine a route for the AV based on the pickup location such that an open seat within the AV is adjacent to the next passenger when the AV arrives at the pickup location for the next passenger; and
     transmit, via the network communication interface, data corresponding to the route to enable the AV to update a current route in order to facilitate a rendezvous with the passenger at the pickup location, wherein the AV autonomously operates control mechanisms of the AV in order to rendezvous with the next passenger at the pickup location such that the open seat within the AV is adjacent to the next passenger.

2. The computing system of claim 1, wherein the executed instructions cause the computing system to determine the position of each of the passengers within the AV based on inertial measurement unit (IMU) data received from the computing device of each of the passengers.

3. The computing system of claim 1, wherein the executed instructions cause the computing system to determine the position of each of the passengers within the AV based on BLUETOOTH localization data received from the computing device of each of the passengers.

4. The computing system of claim 1, wherein executed instructions cause the computing system to determine the position of each of the passengers within the AV based on positioning system data received from the computing device of each of the passengers.

5. The computing system of claim 1, wherein the executed instructions further cause the computing system to:
   transmit seat assignment data to a computing device of the next passenger, the seat assignment data causing the computing device of the next passenger to indicate the open seat within the AV.

6. The computing system of claim 1, wherein the executed instructions further cause the computing system to:
   based on the position of each of the passengers within the AV, transmit one or more notifications to the computing device of each of the passengers within the AV, to change to an updated assigned seat to facilitate the next passenger.

7. The computing system of claim 1, wherein the executed instructions cause the computing system to determine the position of each of the passengers within the AV based, at least in part, on receiving audio data from the computing device of each of the passengers and performing audio localization of the passengers within the vehicle.

8. A non-transitory computer readable medium storing instructions that, when executed by one or more processors of a computing system, cause the computing system to:

receive, via a network communication interface, sensor data from computing devices of passengers riding in an autonomous vehicle (AV);

based on the sensor data, determine a position of each of the passengers within the AV;

determine a next passenger to be picked up by the AV;

based at least in part on the position of each of the passengers within the AV, (i) select a pickup location for the next passenger, and (ii) determine a route for the AV based on the pickup location such that an open seat within the AV is adjacent to the next passenger when the AV arrives at the pickup location for the next passenger; and transmit, via the network communication interface, data corresponding to the route to enable the AV to update a current route in order to facilitate a rendezvous with the passenger at the pickup location, wherein the AV autonomously operates control mechanisms of the AV in order to rendezvous with the next passenger at the pickup location such that the open seat within the AV is adjacent to the next passenger.

9. The non-transitory computer readable medium of claim 8, wherein the executed instructions cause the computing system to determine the position of each of the passengers within the AV based on inertial measurement unit (IMU) data received from the computing device of each of the passengers.

10. The non-transitory computer readable medium of claim 8, wherein the executed instructions cause the computing system to determine the position of each of the passengers within the AV based on BLUETOOTH localization data received from the computing device of each of the passengers.

11. The non-transitory computer readable medium of claim 8, wherein executed instructions cause the computing system to determine the position of each of the passengers within the AV based on positioning system data received from the computing device of each of the passengers.

12. The non-transitory computer readable medium of claim 8, wherein the executed instructions further cause the computing system to:
transmit seat assignment data to a computing device of the next passenger, the seat assignment data causing the computing device of the next passenger to indicate the open seat within the AV.

13. The non-transitory computer readable medium of claim 8, wherein the executed instructions further cause the computing system to:
based on the position of each of the passengers within the AV, transmit one or more notifications to the computing device of each of the passengers within the AV, to change to an updated assigned seat to facilitate the next passenger.

14. The non-transitory computer readable medium of claim 8, wherein the executed instructions cause the computing system to determine the position of each of the passengers within the AV based, at least in part, on receiving audio data from the computing device of each of the passengers and performing audio localization of the passengers within the vehicle.

15. A computer-implemented method of managing transport, the method being performed by one or more processors and comprising:
receiving, via a network communication interface, sensor data from computing devices of passengers riding in an autonomous vehicle (AV);

based on the sensor data, determining a position of each of the passengers within the AV;

determining a next passenger to be picked up by the AV;

based at least in part on the position of each of the passengers within the AV, (i) selecting a pickup location for the next passenger, and (ii) determining a route for the AV based on the pickup location such that an open seat within the AV is adjacent to the next passenger when the AV arrives at the pickup location for the next passenger; and transmitting, via the network communication interface, data corresponding to the route to enable the AV to update a current route in order to facilitate a rendezvous with the passenger at the pickup location, wherein the AV autonomously operates control mechanisms of the AV in order to rendezvous with the next passenger at the pickup location such that the open seat within the AV is adjacent to the next passenger.

16. The method of claim 15, wherein the one or more processors determine the position of each of the passengers within the AV based on inertial measurement unit (IMU) data received from the computing device of each of the passengers.

17. The method of claim 15, wherein the one or more processors determine the position of each of the passengers within the AV based on BLUETOOTH localization data received from the computing device of each of the passengers.

18. The method of claim 15, wherein one or more processors determine the position of each of the passengers within the AV based on positioning system data received from the computing device of each of the passengers.

19. The method of claim 15, further comprising:
transmitting seat assignment data to a computing device of the next passenger, the seat assignment data causing the computing device of the next passenger to indicate the open seat within the AV.

20. The method of claim 15, further comprising:
based on the position of each of the passengers within the AV, transmitting one or more notifications to the computing device of each of the passengers within the AV, to change to an updated assigned seat to facilitate the next passenger.

* * * * *